United States Patent
Moulin et al.

(10) Patent No.: US 9,000,642 B2
(45) Date of Patent: Apr. 7, 2015

(54) CORROSION-RESISTANT JACKETED ACTIVE MAGNETIC BEARING

(75) Inventors: David Moulin, Montrouge (FR); Yves Dupuis, Saint Just (FR)

(73) Assignee: SKF Magnetic Mechatronics, Saint Marcel (FR)

( * ) Notice: Subject to any disclaimer, the term of this patent is extended or adjusted under 35 U.S.C. 154(b) by 429 days.

(21) Appl. No.: 13/437,382

(22) Filed: Apr. 2, 2012

(65) Prior Publication Data

US 2012/0286606 A1    Nov. 15, 2012

(30) Foreign Application Priority Data

May 13, 2011    (FR) ...................................... 11 54176

(51) Int. Cl.
*F16C 32/04* (2006.01)
*H02K 5/12* (2006.01)
*H02K 5/10* (2006.01)

(52) U.S. Cl.
CPC ........... *F16C 32/047* (2013.01); *F16C 2300/42* (2013.01)

(58) Field of Classification Search
CPC ............................ F16C 32/047; F16C 2300/42
USPC ................................................. 310/90.5, 86
See application file for complete search history.

(56) References Cited

U.S. PATENT DOCUMENTS

| | | | |
|---|---|---|---|
| 7,545,066 B2 * | 6/2009 | Baudelocque et al. | 310/90.5 |
| 2003/0107283 A1 | 6/2003 | Suzuki et al. | |
| 2007/0200443 A1 | 8/2007 | Baudelocque et al. | |
| 2008/0218015 A1 * | 9/2008 | Weeber et al. | 310/86 |
| 2011/0043063 A1 * | 2/2011 | Weeber et al. | 310/90.5 |

FOREIGN PATENT DOCUMENTS

| | | |
|---|---|---|
| EP | 1 830 081 | 8/2007 |
| EP | 1 967 286 | 9/2008 |
| FR | 2 632 354 | 12/1989 |

OTHER PUBLICATIONS http://www.outokumpu.com/en/stainless-steel/grades/ferritic/14521/Pages/default.aspx, datasheet ferritic steel, Outkumpu, Apr. 2009.*

* cited by examiner

*Primary Examiner* — Terrance Kenerly
(74) *Attorney, Agent, or Firm* — Hamre, Schumann, Mueller & Larson, P.C.

(57) ABSTRACT

In a jacketed active magnetic bearing for a rotary machine having a rotor in contact with a process gas, there is provided a magnetic bearing comprising a bearing armature of laminated magnetic material secured to said rotor, a bearing stator protected by a first jacket of magnetic anti-corrosion material that co-operates with first housing portions to form a first leaktight housing enclosing the bearing stator, the first jacket being made of a ferritic stainless steel, and the first housing portions having insert parts that are also made of ferritic stainless steel, and that are connected by welds to a housing end-wall portion made of a magnetic anti-corrosion material, the laminated magnetic material forming the bearing armature and the detector armature also being a ferritic stainless steel.

20 Claims, 3 Drawing Sheets

CORROSION-RESISTANT JACKETED ACTIVE MAGNETIC BEARING

FIELD OF THE INVENTION

The present invention relates to a jacketed active magnetic bearing for a rotary machine having a rotor in contact with a process gas, the magnetic bearing comprising a bearing armature of laminated magnetic material secured to the rotor, a bearing stator made up of electromagnet windings associated with a yoke of laminated magnetic material that presents end pole pieces disposed at a short distance from said bearing armature but without making contact therewith, at least one position detector comprising a detector armature of laminated magnetic material mounted on the rotor and a detector stator comprising electromagnet windings associated with a yoke of laminated magnetic material, and electronic control circuits connected to said bearing electromagnet windings and to said detector electromagnet windings.

BACKGROUND OF THE INVENTION

Applications of magnetic bearings to rotary machines have become much more widespread in recent years because of the major advantage procured by them being able to operate directly in the process gas of the machine in question, without any sealing. Thus, in non-limiting manner, magnetic bearings are to be found in turboexpanders, in refrigerator compressors, in electric motors for driving compressors, etc.

In applications in common use, all of the magnetic circuits are based on silicon-iron. The magnetic laminations forming the laminated magnetic material of such circuits thus have the advantage of presenting magnetic characteristics that are well defined and that are guaranteed by their suppliers, in particular a limited hysteresis cycle characterized by its coercive field strength and its remanent magnetic flux density, and high magnetic permeability and high saturation.

However, for more particular applications, in particular for processing natural gas and for applications in acid, particle-carrying, or corrosive environments such as wet hydrogen sulfide ($H_2S$) or wet carbon dioxide ($CO_2$), it is impossible to use such magnetic laminations because they are incompatible with such an environment. The same applies to the stator coils of the bearings and of the detectors in such active magnetic bearings because they are not sealed off from the surrounding environment.

That is why, in patent EP 1 830 081, the Applicant has proposed active magnetic bearings in which the stator of the bearing is protected by a jacket of precipitation hardening martensitic stainless steel, and the stator of the detector is protected by a jacket of austenitic stainless steel, and in which the laminated magnetic material of the rotor is also made of precipitation hardening martensitic stainless steel.

FIG. 1 shows an example of a radial active magnetic bearing of a compressor as described in the above-mentioned patent. There can be seen a rotor 2 of a rotary machine that is designed to be in contact with a process gas, which gas may be acid, corrosive, or a carrier of particles.

A bearing armature 3 of laminated magnetic material is applied to the rotor 2. This armature 3 is made of 17-4 PH precipitation hardening martensitic stainless steel.

A detector armature 4, likewise in 17-4 PH precipitation hardening martensitic stainless steel, is fitted on the rotor 2, in the vicinity of the bearing armature 3.

An airgap 5 presenting thickness that lies for example in the range 0.3 millimeters (mm) to 0.5 mm is provided between firstly the peripheral portion of the rotor 2 fitted with the bearing armature 3 and the detector armature 4, and secondly a first jacket 6 constituting a bearing jacket and a second jacket 7 constituting a detector jacket.

The first jacket 6 is welded in leaktight manner to parts 8, 9 co-operating with said first jacket to constitute a leaktight housing 10 containing the elements constituting the stator of the magnetic bearing 11, i.e. electromagnet windings 12 associated with a yoke 13 of silicon-iron laminated magnetic material. The first jacket 6 is made of 17-4 PH precipitation hardening martensitic stainless steel.

A potting compound 14 is introduced into the inside of the leaktight housing in order to fill its empty spaces around the bearing electromagnet windings 12 totally, and improve its mechanical strength.

A position detector 15 of the electromagnetic type comprises a stator that is disposed in a second housing 16 distinct from the first housing 10 and closed by the second jacket 7 that is welded in leaktight manner to the parts 17, 18 of the second housing. The stator of the position detector comprises electromagnet windings 19 associated with a yoke 20 of silicon-iron laminated magnetic material.

The second jacket 7 is made of austenitic stainless steel of the American Iron and Steel Institute (AISI) 304, 304L, 316, or 316L type.

In the same way as for the bearing stator, a potting compound 21 is introduced into the inside of the detector housing 16 in order to fill its empty spaces and improve its mechanical strength.

Preferably, the first leaktight housing 10 containing the bearing stator and the second leaktight housing 16 containing the detector stator are interconnected in leaktight manner in a zone that is remote from the first and second jackets 6, 7.

The electromagnet windings 12, 19 of the bearing and of the detector are connected to electronic control circuits 22 that, as shown, can be placed outside the housings of the bearing.

The jackets put into place in this way isolate the magnetic circuits of the stator from the gaseous environment, thereby making it possible to use conventional magnetic laminations based on silicon-iron for said circuits. At the rotor, the use of laminations made of precipitation hardening martensitic stainless steel procures this resistance to the gaseous environment directly without any other protection.

However, the magnetic properties of precipitation hardening martensitic stainless steels are far from ideal, reducing the performance of the magnetic bearing. Its low magnetic flux density at saturation puts a limit on the static and dynamic load capacity of the bearings due to limited magnetic flux density, and requires the lengths of the bearings to be increased for the same load capacity, and its wide hysteresis cycle causes large iron losses, which are about ten times greater than the losses caused in a conventional rotor equipped with silicon-iron magnetic laminations, resulting in the magnetic bearing being heated to a considerable extent, and requiring said bearing to be cooled to a considerable extent.

In addition, in "oil and gas" environments, with applications required to comply with the ANSI/NACE MR0175/ISO15156 Standard "Petroleum and Natural Gas Industries—Materials for Use in $H_2S$-containing Environments in Oil and Gas Production", the use of precipitation hardening martensitic stainless steels requires the welds to be heat-treated, typically by high-temperature annealing performed at in the range 500° C. to 800° C. (of the H1150D or H1150M type), such heat-treatment being incompatible with the material of the windings of the bearing stator 12 that, conventionally, cannot withstand temperatures higher than 250° C.

In order to achieve such compatibility, U.S. Pat. No. 7,847,454 thus proposes using a two-material bearing jacket made up of a magnetic central portion made of precipitation hardening martensitic stainless steel, on either side of which non-magnetic inserts are fastened. Thus, by also equipping the housing with non-magnetic inserts, it is possible, once those inserts have been welded both to the jacket and to the housing, and once all of those welds have been subjected to high-temperature annealing, to place the windings in the housing and then to weld the non-magnetic inserts together, without applying any particular heat treatment, and at a temperature compatible with the material of the windings, in order to make the housing leaktight.

Unfortunately, those welding operations are lengthy and complex, and are thus costly. They are also major sources of leakage or of manufacturing defects, in particular at the two-material bearing sleeve which, since it is of very small thickness, makes it particularly difficult to weld to the inserts.

OBJECT AND SUMMARY OF THE INVENTION

An object of the present invention is to remedy the above-mentioned drawbacks, and in particular to make operation possible in an oil and gas environment while also preserving the advantage of the principle of jacketed bearings.

These objects are achieved by means of a jacketed active magnetic bearing for a rotary machine having a rotor in contact with a process gas, the magnetic bearing comprising a bearing armature of laminated magnetic material secured to the rotor, a bearing stator made up of electromagnet windings associated with a yoke of laminated magnetic material that presents end pole pieces disposed at a short distance from said bearing armature but without making contact therewith, at least one position detector comprising a detector armature of laminated magnetic material mounted on the rotor and a detector stator comprising electromagnet windings associated with a yoke of laminated magnetic material, and electronic control circuits connected to said bearing electromagnet windings and to said detector electromagnet windings;

said bearing stator being protected by a first jacket of magnetic anti-corrosion material that co-operates with first housing portions to form a first leaktight housing enclosing said bearing stator, and said detector stator being protected by a second jacket of non-magnetic anti-corrosion material that co-operates with second housing portions to form a second leaktight housing enclosing said detector stator;

wherein said first jacket is made of a ferritic stainless steel, wherein said first housing portions have insert parts that are also made of ferritic stainless steel, and that are connected by welds, before said electromagnet windings and said bearing stator yoke are put into place, to a housing end-wall portion made of a magnetic anti-corrosion material, and wherein said laminated magnetic material forming said bearing armature and said detector armature is a ferritic stainless steel.

Thus, by using a stator jacket made of ferritic stainless steel, it is possible to maintain an airgap and bearing dimensions that are conventional and it becomes possible to implement active magnetic bearings in an "oil and gas" environment in a manner that is simple and inexpensive, and without any risk of destroying the windings of the bearing stator during the welding operations. The use of a ferritic stainless steel makes it possible, in addition, to counter numerous negative aspects of using precipitation hardening martensitic stainless steels that are conventionally used for such applications (reducing iron losses in the rotor, and thus reducing heating of the rotor, optimizing the load capacity of the bearing, and making the system more compact).

In an alternative embodiment, said laminated magnetic material forming said armatures or said yokes is replaced with a magnetic material that is completely or almost completely uninterrupted (massive or quasi-massive).

Preferably, said ferritic stainless steel is of the American Iron and Steel Institute (AISI) 436, 441, 444, or 445 type.

Advantageously, said welds connecting said first jacket to said insert parts are formed by electron bombardment welding, laser welding, or tungsten inert gas (TIG) welding, and without high-temperature annealing.

Depending on whether said housing end-wall portion is made of ferritic stainless steel or of precipitation hardening martensitic stainless steel, said insert parts are welded to said housing end-wall portion by electron bombardment welding, laser welding, or TIG welding, and without high-temperature annealing, or they are fastened to said housing end-wall portion by welds that have been subjected to high-temperature annealing of the H1150D and H1150M type.

The invention is applicable both to a radial bearing and to an axial bearing, or indeed to a bearing combining a radial bearing and an axial bearing such as bearing of the conical type.

The invention also provides any turboexpander or compressor equipped with such active magnetic bearings.

BRIEF DESCRIPTION OF THE DRAWINGS

Other characteristics and advantages of the invention appear from the following description of particular embodiments of the invention given by way of example with reference to the accompanying drawings, in which.

MORE DETAILED DESCRIPTION

Figure 1:
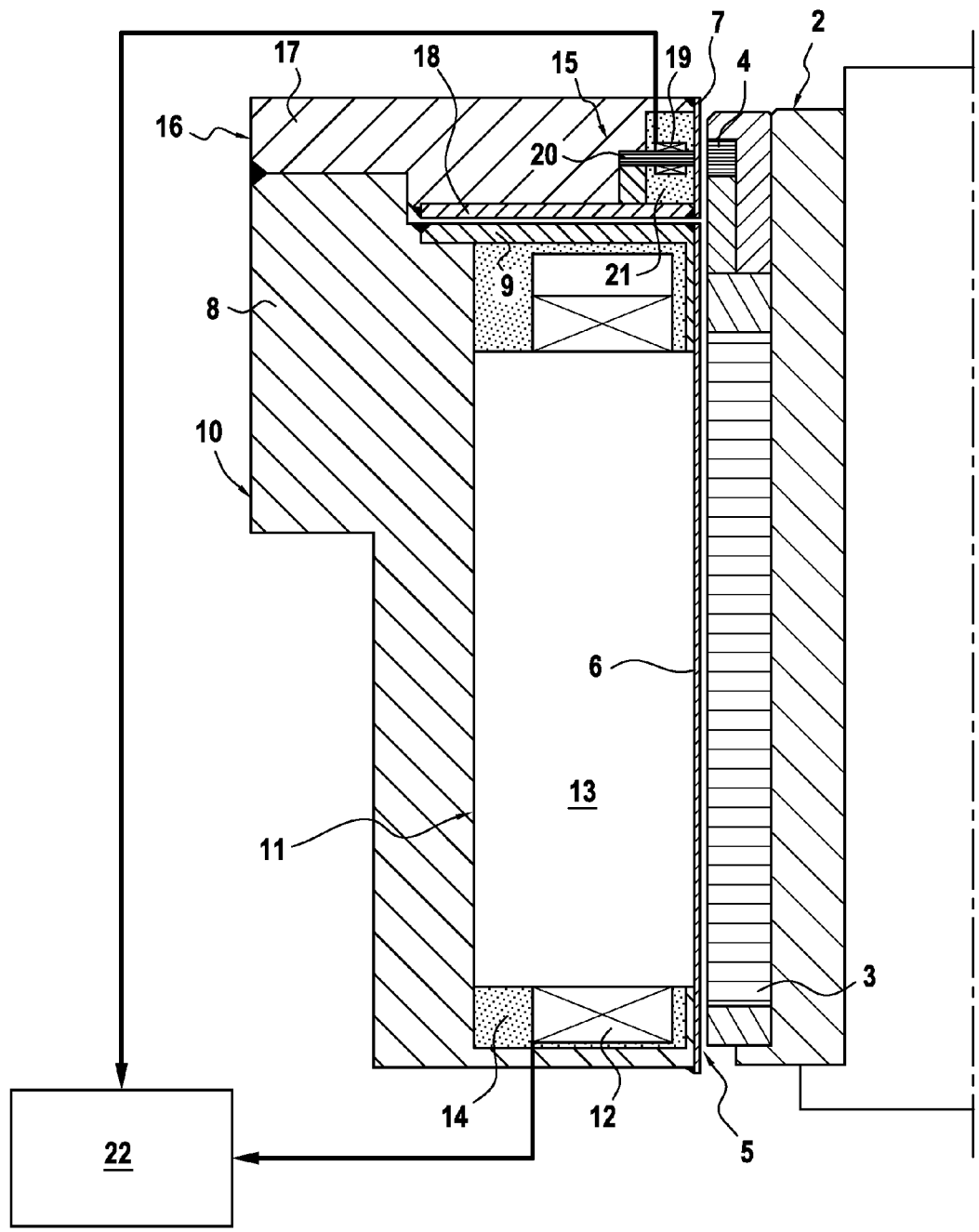
FIG. 1 is an axial half-section view of an example of a prior art radial active magnetic bearing.
Figure 2:
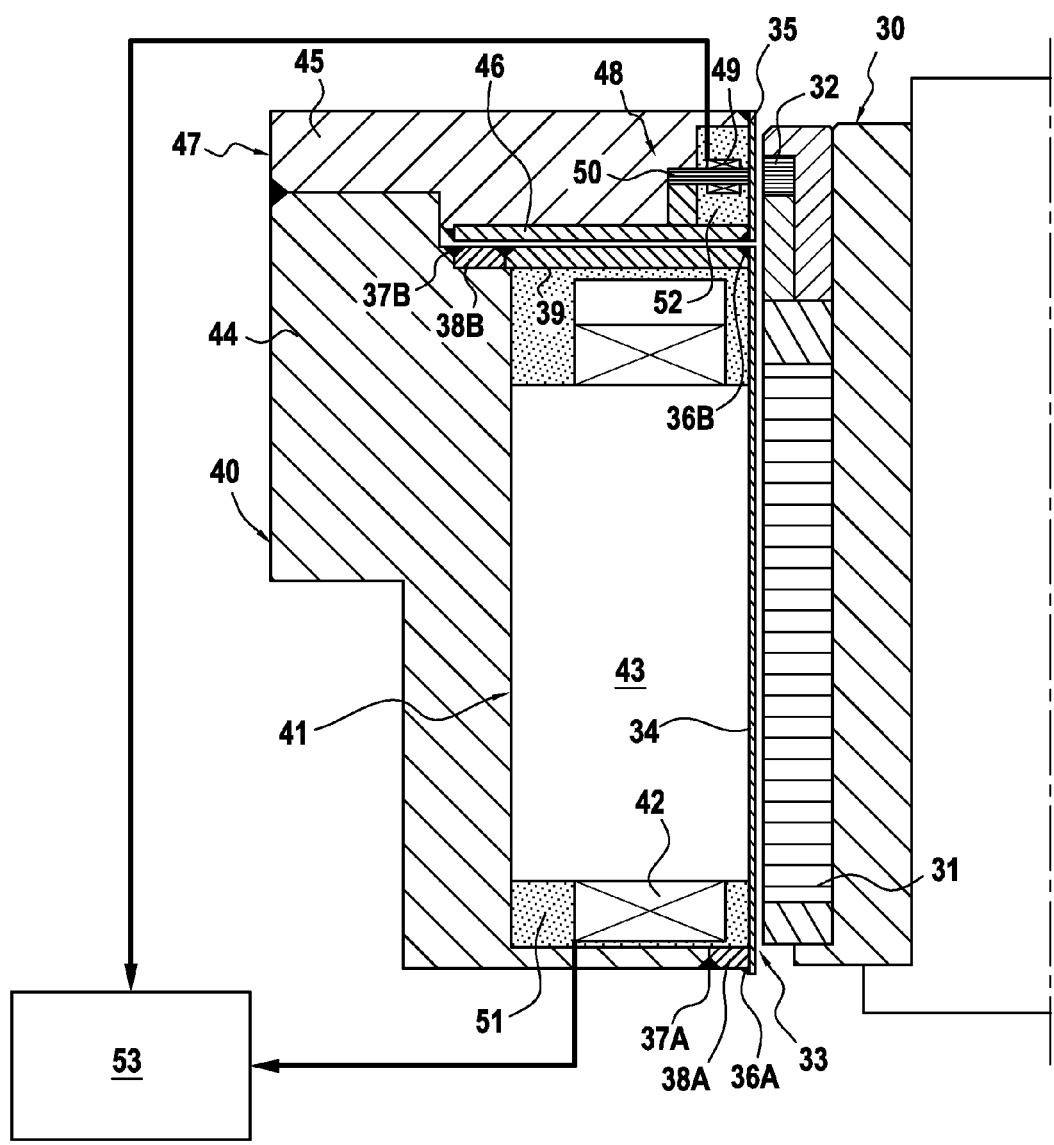
FIG. 2 is an axial half-section view of a first example of a radial active magnetic bearing in accordance with the present invention.

With reference to FIG. 2, there can be seen a rotor 30 of a rotary machine that is designed to be in contact with a process gas, which gas may be acid, corrosive, or a carrier of particles.

For example, the rotary machine may be a turboexpander for processing natural gas, or a refrigerator compressor.

A bearing armature 31 of laminated magnetic material is applied to the rotor 30. This armature 31 is made of a magnetic anti-corrosion material such as a ferritic stainless steel of the AISI 436, 441, 444, or 445 type that is available in laminations of small thickness, typically in the range 50 micrometers ($\mu$m) to 3 mm, and in particular presenting a thickness of 0.2 mm.

A detector armature 32, likewise in laminated magnetic material, is fitted on the rotor 30, in the vicinity of the bearing armature 31. Like the armature 31, this armature 32 is made of a magnetic anti-corrosion material such as a ferritic stainless steel of the AISI 436, 441, 444, or 445 type.

An airgap 33 presenting thickness that lies for example in the range 0.3 mm to 1 mm is provided between firstly the peripheral portion of the rotor 30 fitted with the bearing armature 31 and the detector armature 32, and secondly a first jacket 34 constituting a bearing stator jacket and a second jacket 35 constituting a detector stator jacket.

The bearing stator jacket 34 is made of a magnetic anti-corrosion material such as a ferritic stainless steel of the AISI 436, 441, 444, or 445 type and presents a thickness advantageously lying in the range 0.1 mm to 0.8 mm. It is welded in leaktight manner by welds 36A, 36B to insert parts 38A, 39 (made of a material compatible with the material of the jacket or indeed identical to said material of the jacket) in such a manner as to constitute a leaktight housing 40 containing the elements constituting the stator of the magnetic bearing 41, i.e. electromagnet windings 42 associated with a yoke 43 of laminated magnetic material.

The welds of the bearing stator jacket are performed without high-temperature annealing, conventionally by electron bombardment welding, by laser welding, or by TIG welding, and within a Vickers hardness limit of 250 NV, regardless of the temperature or of the chloride concentration of the process gas, and up to an $H_2S$ pressure of 10 kilopascals (kPa).

Prior to putting the yoke 43 and its windings 42 in place, care is taken to weld the insert parts 38A, 38B to the housing portion 44 serving to form the end wall of the leaktight housing 40, and conventionally made of a precipitation hardening martensitic stainless steel. Unlike the preceding welds, and in compliance with the ANSI/NACE MR0175/ISO15156 Standard, these welds 37A, 37B are subjected to heat treatment of the H1150D or H1150M type, including high-temperature annealing for relaxing the residual stresses to which they are then subjected. Naturally, when this housing end-wall portion is itself made of a ferritic stainless steel of the AISI 436, 441, 444, or 445 type, said annealing is not necessary, and the welds can then be performed at temperatures compatible with the material of the windings.

Figure 2A:
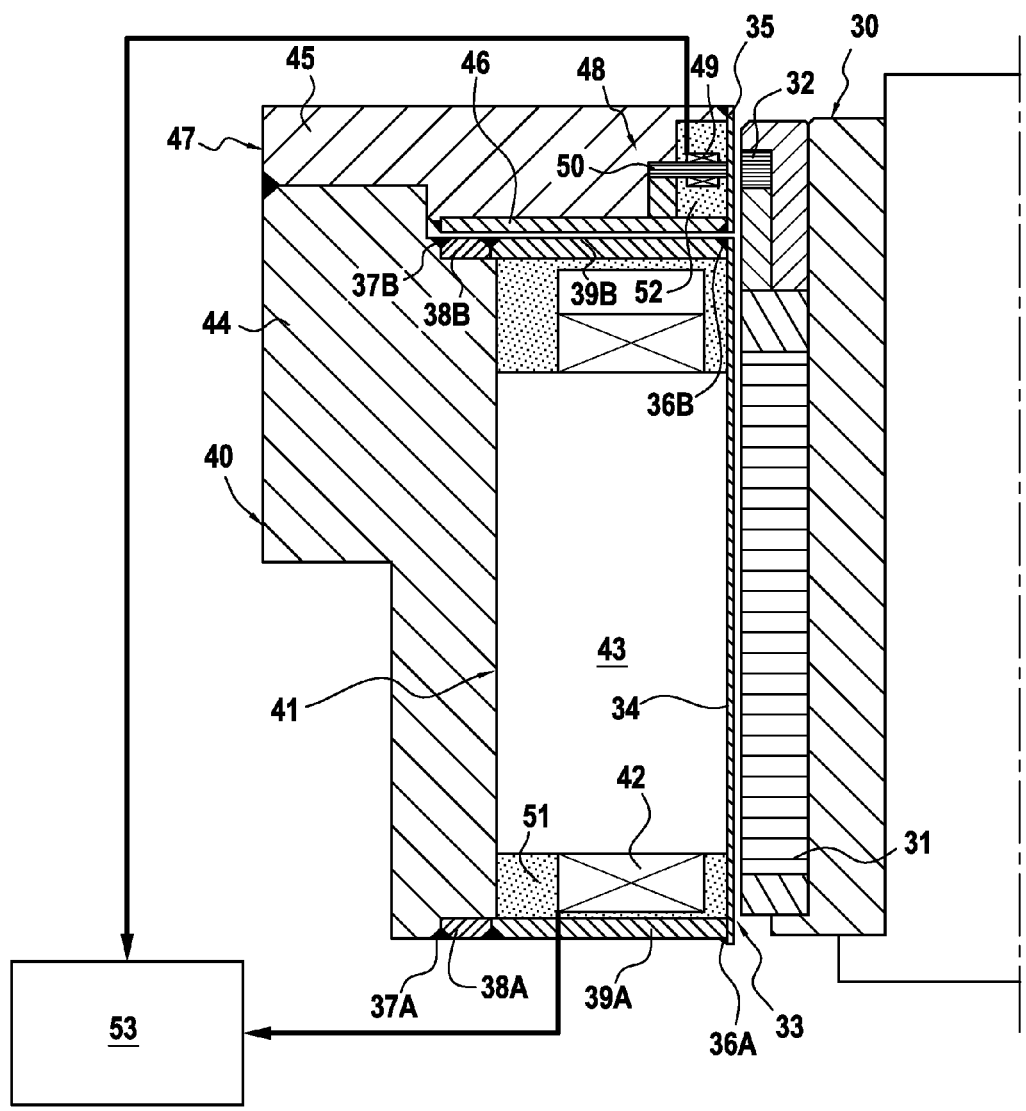
FIG. 2A is an axial half-section view of a second example of a radial active magnetic bearing in accordance with the present invention.

It should be noted that, in order to enable the yoke 43 and its windings 42 to be mounted, at least one of the two inserts is made up of two portions 38B, 39 that are welded together by a weld without high-temperature annealing, the second portion 39 forming a cheek plate. In FIG. 2A, both of the inserts are made up of two portions 38A & 39A and 38B & 39B, the two portions of each insert being welded together without high-temperature annealing.

The detector stator jacket 35 is made conventionally of austenitic stainless steel of the AISI 304, 304L, 316, or 316L, type, and it is welded conventionally in leaktight manner to parts 45, 46 in such manner as to form a second leaktight housing 47 enclosing the stator 48 of the position detector comprising electromagnet windings 49 associated with a yoke 50 made of a laminated magnetic material.

The yokes 43, 50 have end pole pieces that are in contact with their respective stator jackets 34, 35 and that are thus a short distance from the armatures 31, 32, without making contact therewith.

A potting compound 51, 52 is introduced into the insides of the first and second leaktight housings 40 and 47 in order to fill their empty spaces around the bearing and detector stator electromagnet windings 42 and 49, and improve their mechanical strength. The potting compound that fills the empty spaces may be introduced conventionally using a vacuum and pressure type method so as to guarantee filling that is total and perfect.

The bearing stator electromagnet windings 42 and the detector stator electromagnet windings 49 are connected to electronic control circuits 53 that may be disposed outside the leaktight enclosures 40, 47, which may themselves be connected in leaktight manner to the remainder of the casing constituting a leaktight enclosure surrounding the rotor 30 that is in contact with the process gas.

Thus, in accordance with the invention, by using a stator jacket made of ferritic stainless steel and insert parts made of the same material and previously welded to the stator housing, it becomes possible to implement active magnetic bearings in an "oil and gas" environment in a manner that is simple and therefore inexpensive. In addition, since ferritic stainless steel is compatible with corrosive environments, without requiring any particular protection, it can also be used in the magnetic circuit of the position detector rotors in the form of a stack of laminations that are electrically insulated from one another, and in the magnetic circuit of the bearing rotors in the form of a stack of laminations that are electrically insulated from one another.

The mechanical and magnetic characteristics of ferritic stainless steels are considerably better than those of prior art precipitation hardening martensitic stainless steels because:

Their magnetic hysteresis cycle is narrow and makes it possible to limit the losses in rotor portion of the bearing, enabling the efficiency of the machine to be improved and the cooling of the machine to be less critical. It makes it possible, in particular, to test the machine at ambient pressure, unlike when the machine is made up of laminations of precipitation hardening martensitic stainless steel and requires a pressurized surrounding environment in order to remove the rotor losses. Thus, when the magnetic flux density is modulated to 1.1 teslas (T), the coercive field strength of a lamination of ferritic stainless steel of the AISI 444 type is measured at less than 1500 amps per meter (A/m), whereas a precipitation hardening martensitic stainless steel such as 17-4PH has a high coercive field strength that is higher than 5000 A/m.

The high magnetic flux density at saturation and the high magnetic permeability make it possible to maintain static and dynamic load capacity close to the static and dynamic load capacity of a conventional silicon-iron bearing, with compactness comparable to the compactness of conventional magnetic bearings. Thus, the saturation of a ferritic stainless steel lamination of the above-mentioned type is measured at greater than 1.4 T, whereas a precipitation hardening martensitic stainless steel has a lower saturation, of about 1.1 T. The magnetic excitation at 1.1 T is measured at about 1000 A/m for silicon-iron, at 5000 A/m for AISI 444 ferritic stainless steel, and at 20,000 A/m for precipitation hardening stainless steel of the 17-4 PH type.

The high electrical resistivity also makes it possible to limit the iron losses, and thus to limit the heating of the machine and to facilitate controlling the temperature of the machine. A resistivity ten times higher than the resistivity of precipitation hardening martensitic stainless steels is characteristic of ferritic stainless steels (about 0.8 ohm square millimeters per meter ($\Omega mm^2/m$) for AISI 444 ferritic stainless steel, about 0.07 $\Omega mm^2/m$ for precipitation hardening martensitic stainless steels, and about 0.04 $\Omega mm^2/m$ for silicon-irons).

Thus, the use of this type of material makes it possible to implement a system of bearings suitable for being used in a corrosive surrounding environment, in particular in the presence of wet $H_2S$ and of wet $CO_2$, in compliance with the ANSI/NACE 4R0175/ISO 15156 Standard, while maintaining performance very close to the performance obtained with a conventional technology using silicon-iron magnetic laminations, and with dimensions identical to the dimensions of conventional silicon-iron bearings. In addition, the homogeneity of the magnetic properties that is procured by means of a simpler crystallographic structure makes it possible to reduce very considerably the variations that are generated at the rotor and that degrade the quality of detection of its position and thus the quality of its servo-control.

The above description is made with reference to a radial type magnetic bearing. Naturally, however, it can be applied in like manner to a magnetic bearing of axial type or to a magnetic bearing of conical type combining the functions of a radial bearing and of an axial bearing.

In the same way, although reference is made to using laminated magnetic materials for making the armatures 31, 32 and the yokes 43, 50, said armatures or optionally said yokes may also be made with ferritic stainless steel of the AISI 436, 441, 444, or 445 type in completely or almost completely uninterrupted form, i.e. without any electrical insulation between the component magnetic laminations (massive or quasi-massive).

What is claimed is:

1. A jacketed active magnetic bearing for a rotary machine having a rotor in contact with a process gas, the magnetic bearing comprising a bearing armature of laminated magnetic material secured to said rotor, a bearing stator made up of electromagnet windings associated with a yoke of laminated magnetic material that presents end pole pieces disposed at a short distance from said bearing armature but without making contact therewith, at least one position detector comprising a detector armature of laminated magnetic material mounted on the rotor and a detector stator comprising electromagnet windings associated with a yoke of laminated magnetic material, and electronic control circuits connected to said bearing electromagnet windings and to said detector electromagnet windings;

said bearing stator being protected by a first jacket of magnetic anti-corrosion material that co-operates with first housing portions to form a first leaktight housing enclosing said bearing stator, and said detector stator being protected by a second jacket of non-magnetic anti-corrosion material that co-operates with second housing portions to form a second leaktight housing enclosing said detector stator;

wherein said first jacket is made of a ferritic stainless steel, wherein said first housing portions have insert parts that are also made of ferritic stainless steel, and that are connected by first welds to said first jacket, said insert parts also being connected by second welds, before said electromagnet windings and said bearing stator yoke are put into place, to a housing end-wall portion made of a magnetic anti-corrosion material, and wherein said laminated magnetic material forming said bearing armature and said detector armature is a ferritic stainless steel.

2. An active magnetic bearing according to claim 1, wherein said ferritic stainless steel is of the AISI 436, 441, 444, or 445 type.

3. An active magnetic bearing according to claim 2, wherein said first welds connecting said first jacket to said insert parts are formed by electron bombardment welding, laser welding, or TIG welding, and without high-temperature annealing.

4. An active magnetic bearing according to claim 3, wherein said housing end-wall portion is made of ferritic stainless steel, and said insert parts are welded to said housing end-wall portion by electron bombardment welding, laser welding, or TIG welding, and without high-temperature annealing.

5. An active magnetic bearing according to claim 3, wherein said housing end-wall portion is made of precipitation hardening martensitic stainless steel, and said insert parts are fastened to said housing end-wall portion by said second welds that have been subjected to high-temperature annealing of the H1150D and H1150M type.

6. An active magnetic bearing according to claim 3, wherein at least one of said insert parts is made up of two portions welded together by electron bombardment welding, laser welding, or TIG welding, and without high-temperature annealing.

7. An active magnetic bearing according to claim 1, constituting a radial bearing.

8. An active magnetic bearing according to claim 1, constituting an axial bearing.

9. A turboexpander for processing natural gas including at least one active magnetic bearing according to claim 1.

10. A refrigerator compressor including at least one active magnetic bearing according to claim 1.

11. A jacketed active magnetic bearing for a rotary machine having a rotor in contact with a process gas, the magnetic bearing comprising a bearing armature of completely or almost completely uninterrupted magnetic material secured to said rotor, a bearing stator made up of electromagnet windings associated with a yoke of completely or almost completely uninterrupted magnetic material that presents end pole pieces disposed at a short distance from said bearing armature but without making contact therewith, at least one position detector comprising a detector armature of completely or almost completely uninterrupted magnetic material mounted on the rotor and a detector stator comprising electromagnet windings associated with a yoke of completely or almost completely uninterrupted magnetic material, and electronic control circuits connected to said bearing electromagnet windings and to said detector electromagnet windings;

said bearing stator being protected by a first jacket of magnetic anti-corrosion material that co-operates with first housing portions to form a first leaktight housing enclosing said bearing stator, and said detector stator being protected by a second jacket of non-magnetic anti-corrosion material that co-operates with second housing portions to form a second leaktight housing enclosing said detector stator;

wherein said first jacket is made of a ferritic stainless steel, wherein said first housing portions have insert parts that are also made of ferritic stainless steel, and that are connected by first welds to said first jacket, said insert parts also being connected by second welds, before said electromagnet windings and said bearing stator yoke are put into place, to a housing end-wall portion made of a magnetic anti-corrosion material, and wherein said completely or almost completely uninterrupted magnetic material forming said bearing armature and said detector armature is a ferritic stainless steel.

12. An active magnetic bearing according to claim 11, wherein said ferritic stainless steel is of the AISI 436, 441, 444, or 445 type.

13. An active magnetic bearing according to claim 12, wherein said first welds connecting said first jacket to said insert parts are formed by electron bombardment welding, laser welding, or TIG welding, and without high-temperature annealing.

14. An active magnetic bearing according to claim 13, wherein said housing end-wall portion is made of ferritic stainless steel, and said insert parts are welded to said housing end-wall portion by electron bombardment welding, laser welding, or TIG welding, and without high-temperature annealing.

15. An active magnetic bearing according to claim 13, wherein said housing end-wall portion is made of precipitation hardening martensitic stainless steel, and said insert parts are fastened to said housing end-wall portion by said second welds that have been subjected to high-temperature annealing of the H1150D and H1150M type.

16. An active magnetic bearing according to claim 13, wherein at least one of said insert parts is made up of two portions welded together by electron bombardment welding, laser welding, or TIG welding, and without high-temperature annealing.

17. An active magnetic bearing according to claim 11, constituting a radial bearing.

18. An active magnetic bearing according to claim 11, constituting an axial bearing.

19. A turboexpander for processing natural gas including at least one active magnetic bearing according to claim 11.

20. A refrigerator compressor including at least one active magnetic bearing according to claim 11.

* * * * *